(12) United States Patent
Madnani et al.

(10) Patent No.: US 8,099,550 B1
(45) Date of Patent: Jan. 17, 2012

(54) SYSTEM AND METHOD FOR SINGLE INSTANCE STORAGE

(75) Inventors: Kiran Madnani, Framingham, MA (US); Randall H. Shain, Wrentham, MA (US); Roy E. Clark, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1051 days.

(21) Appl. No.: 11/967,918

(22) Filed: Dec. 31, 2007

(51) Int. Cl.
*G06F 12/00* (2006.01)
*H04H 20/71* (2008.01)

(52) U.S. Cl. ... 711/114; 370/312; 370/390; 707/999.01; 711/162

(58) Field of Classification Search ............ 370/312, 370/390; 707/999.01; 711/114, 162
See application file for complete search history.

(56) References Cited

U.S. PATENT DOCUMENTS

| | | | |
|---|---|---|---|
| 6,665,780 B1 * | 12/2003 | Bradley | 711/162 |
| 6,834,326 B1 * | 12/2004 | Wang et al. | 711/114 |
| 6,950,901 B2 * | 9/2005 | Chiu et al. | 711/114 |
| 7,529,781 B2 * | 5/2009 | Frey et al. | 1/1 |
| 7,590,114 B1 * | 9/2009 | Bishara | 370/390 |
| 7,673,112 B2 * | 3/2010 | Takeuchi et al. | 711/170 |
| 7,843,866 B1 * | 11/2010 | Madnani et al. | 370/312 |
| 2005/0254444 A1 * | 11/2005 | Meier et al. | 370/312 |
| 2005/0256972 A1 * | 11/2005 | Cochran et al. | 709/245 |
| 2006/0291467 A1 * | 12/2006 | Henry et al. | 370/390 |
| 2008/0040646 A1 * | 2/2008 | Forhan et al. | 714/770 |
| 2008/0162585 A1 * | 7/2008 | Takahashi | 707/200 |
| 2009/0177840 A1 * | 7/2009 | Dale et al. | 711/118 |

* cited by examiner

*Primary Examiner* — Kevin Ellis
*Assistant Examiner* — Mehdi Namazi
(74) *Attorney, Agent, or Firm* — Holland & Knight LLP; Brian J Colandreo, Esq.; Mark H Whittenberger, Esq

(57) ABSTRACT

A method and computer program product for defining a multicast group within a local area network. The multicast group includes a storage initiator device and a plurality of storage targets. Each of the plurality of storage targets includes a storage index that identifies one or more data segments stored on the storage target. A write request for storing a data segment within the multicast group is received on the storage initiator device. A "check exist" message is generated that defines the data segment to be stored within the multicast group. The "check exist" message is multicast to the plurality of storage targets included within the multicast group.

8 Claims, 3 Drawing Sheets

SYSTEM AND METHOD FOR SINGLE INSTANCE STORAGE

TECHNICAL FIELD

This disclosure relates to storage networks and, more particularly, to multicast storage networks.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

SUMMARY OF DISCLOSURE

In a first implementation, a data storage method includes defining a multicast group within a local area network. The multicast group includes a storage initiator device and a plurality of storage targets. Each of the plurality of storage targets includes a storage index that identifies one or more data segments stored on the storage target. A write request for storing a data segment within the multicast group is received on the storage initiator device. A "check exist" message is generated that defines the data segment to be stored within the multicast group. The "check exist" message is multicast to the plurality of storage targets included within the multicast group.

One or more of the following features may be included. The "check exist" message may be processed on each of the plurality of storage targets to compare the data segment defined within the "check exist" message to the one or more data segments identified within the storage index to determine if the data segment to be stored within the multicast group is already stored on the storage target processing the "check exist" message.

If it is determined by the storage target processing the "check exist" message that the data segment defined within the "check exist" message is already stored on the storage target processing the "check exist" message, a positive response message may be generated, on the storage target processing the "check exist" message, that is multicast to the multicast group. If it is determined by the storage target processing the "check exist" message that the data segment defined within the "check exist" message is not already stored on the storage target processing the "check exist" message, a negative response message may be generated, on the storage target processing the "check exist" message, that is multicast to the multicast group. The negative response message may include information concerning the storage target processing the "check exist" message chosen from the group consisting of: identification of the available storage capacity; identification of the current load; identification of the current health; and identification of the proximity.

If each storage target multicasts a negative response message to the multicast group, the negative response messages may be processed, on the storage initiator device, to identify one or more selected storage targets, chosen from the plurality of storage targets, for storing the data segment. The data segment may be provided to the one or more selected storage targets. The data segment may be stored on each of the one or more selected storage targets. The storage index on each of the one or more selected storage targets may be updated to identify the data segment.

In another implementation, a computer program product resides on a computer readable medium that has a plurality of instructions stored on it. When executed by a processor, the instructions cause the processor to perform operations including defining a multicast group within a local area network. The multicast group includes a storage initiator device and a plurality of storage targets. Each of the plurality of storage targets includes a storage index that identifies one or more data segments stored on the storage target. A write request for storing a data segment within the multicast group is received on the storage initiator device. A "check exist" message is generated that defines the data segment to be stored within the multicast group. The "check exist" message is multicast to the plurality of storage targets included within the multicast group.

One or more of the following features may be included. The "check exist" message may be processed on each of the plurality of storage targets to compare the data segment defined within the "check exist" message to the one or more data segments identified within the storage index to determine if the data segment to be stored within the multicast group is already stored on the storage target processing the "check exist" message.

If it is determined by the storage target processing the "check exist" message that the data segment defined within the "check exist" message is already stored on the storage target processing the "check exist" message, a positive response message may be generated, on the storage target processing the "check exist" message, that is multicast to the multicast group. If it is determined by the storage target processing the "check exist" message that the data segment defined within the "check exist" message is not already stored on the storage target processing the "check exist" message, a negative response message may be generated, on the storage target processing the "check exist" message, that is multicast to the multicast group. The negative response message may include information concerning the storage target processing the "check exist" message chosen from the group consisting of: identification of the available storage capacity; identification of the current load; identification of the current health; and identification of the proximity.

If each storage target multicasts a negative response message to the multicast group, the negative response messages may be processed, on the storage initiator device, to identify one or more selected storage targets, chosen from the plurality of storage targets, for storing the data segment. The data segment may be provided to the one or more selected storage targets. The data segment may be stored on each of the one or more selected storage targets. The storage index on each of the one or more selected storage targets may be updated to identify the data segment.

In another implementation, a data storage method includes defining a multicast group within a local area network. The multicast group includes a storage initiator device and a plurality of storage targets. Each of the plurality of storage targets includes a storage index that identifies one or more data segments stored on the storage target. A read request for reading a data segment from the multicast group is received on the storage initiator device. A "check exist" message is generated that defines the data segment to be read from the multicast group. The "check exist" message is multicast to the plurality of storage targets included within the multicast group.

One or more of the following features may be included. The "check exist" message may be processed on each of the plurality of storage targets to compare the data segment defined within the "check exist" message to the one or more data segments identified within the storage index to determine if the data segment to be read from the multicast group is available on the storage target processing the "check exist" message.

If it is determined by the storage target processing the "check exist" message that the data segment defined within the "check exist" message is available on the storage target processing the "check exist" message, a positive response message may be generated, on the storage target processing the "check exist" message, that is multicast to the multicast group. The positive response message may be received on the storage initiator device. The data segment may be provided from the storage target that multicast the positive response message to the storage initiator device.

In another implementation, a computer program product resides on a computer readable medium that has a plurality of instructions stored on it. When executed by a processor, the instructions cause the processor to perform operations including defining a multicast group within a local area network. The multicast group includes a storage initiator device and a plurality of storage targets. Each of the plurality of storage targets includes a storage index that identifies one or more data segments stored on the storage target. A read request for reading a data segment from the multicast group is received on the storage initiator device. A "check exist" message is generated that defines the data segment to be read from the multicast group. The "check exist" message is multicast to the plurality of storage targets included within the multicast group.

One or more of the following features may be included. The "check exist" message may be processed on each of the plurality of storage targets to compare the data segment defined within the "check exist" message to the one or more data segments identified within the storage index to determine if the data segment to be read from the multicast group is available on the storage target processing the "check exist" message.

If it is determined by the storage target processing the "check exist" message that the data segment defined within the "check exist" message is available on the storage target processing the "check exist" message, a positive response message may be generated, on the storage target processing the "check exist" message, that is multicast to the multicast group. The positive response message may be received on the storage initiator device. The data segment may be provided from the storage target that multicast the positive response message to the storage initiator device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
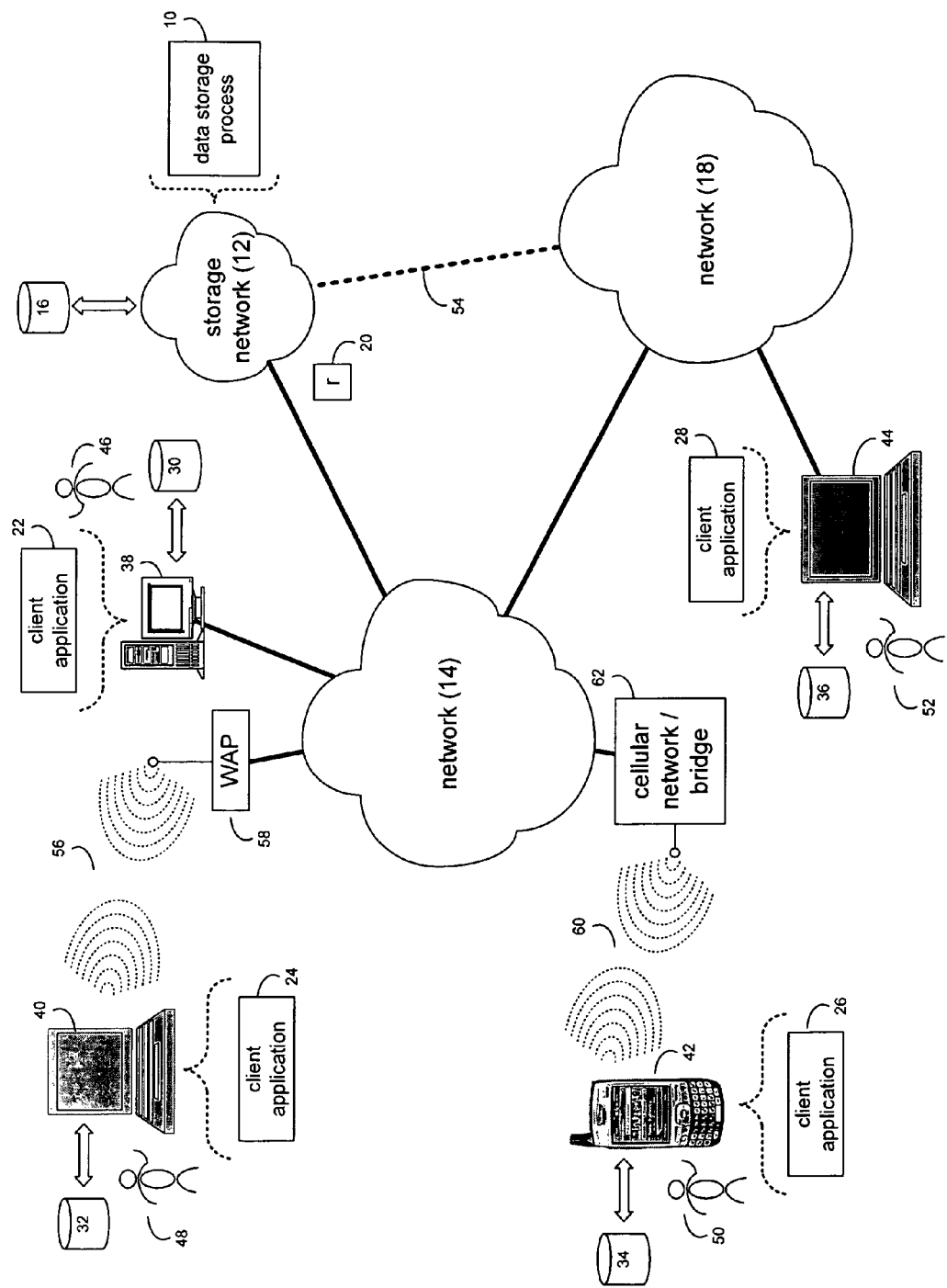
FIG. 1 is a diagrammatic view of a storage network and a data storage process coupled to a distributed computing network.

System Overview:

Referring to FIG. 1, there is shown data storage process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, data storage process 10 may define a multicast group within a local area network. The multicast group may include a storage initiator device and a plurality of storage targets. Each of the plurality of storage targets may include a storage index that identifies one or more data segments stored on the storage target.

A write request for storing a data segment within the multicast group may be received on the storage initiator device. A "check exist" message may be generated that defines the data segment to be stored within the multicast group. The "check exist" message may be multicast to the plurality of storage targets included within the multicast group.

A read request for reading a data segment from the multicast group may be received on the storage initiator device. A "check exist" message may be generated that defines the data segment to be read from the multicast group. The "check exist" message may be multicast to the plurality of storage targets included within the multicast group.

The instruction sets and subroutines of data storage process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wireless sly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Storage Process:

For the following discussion, client application 22 is going to be described for illustrative purposes. However, this is not intended to be a limitation of this disclosure, as other client applications (e.g., client applications 24, 26, 28) may be equally utilized.

Figure 2:
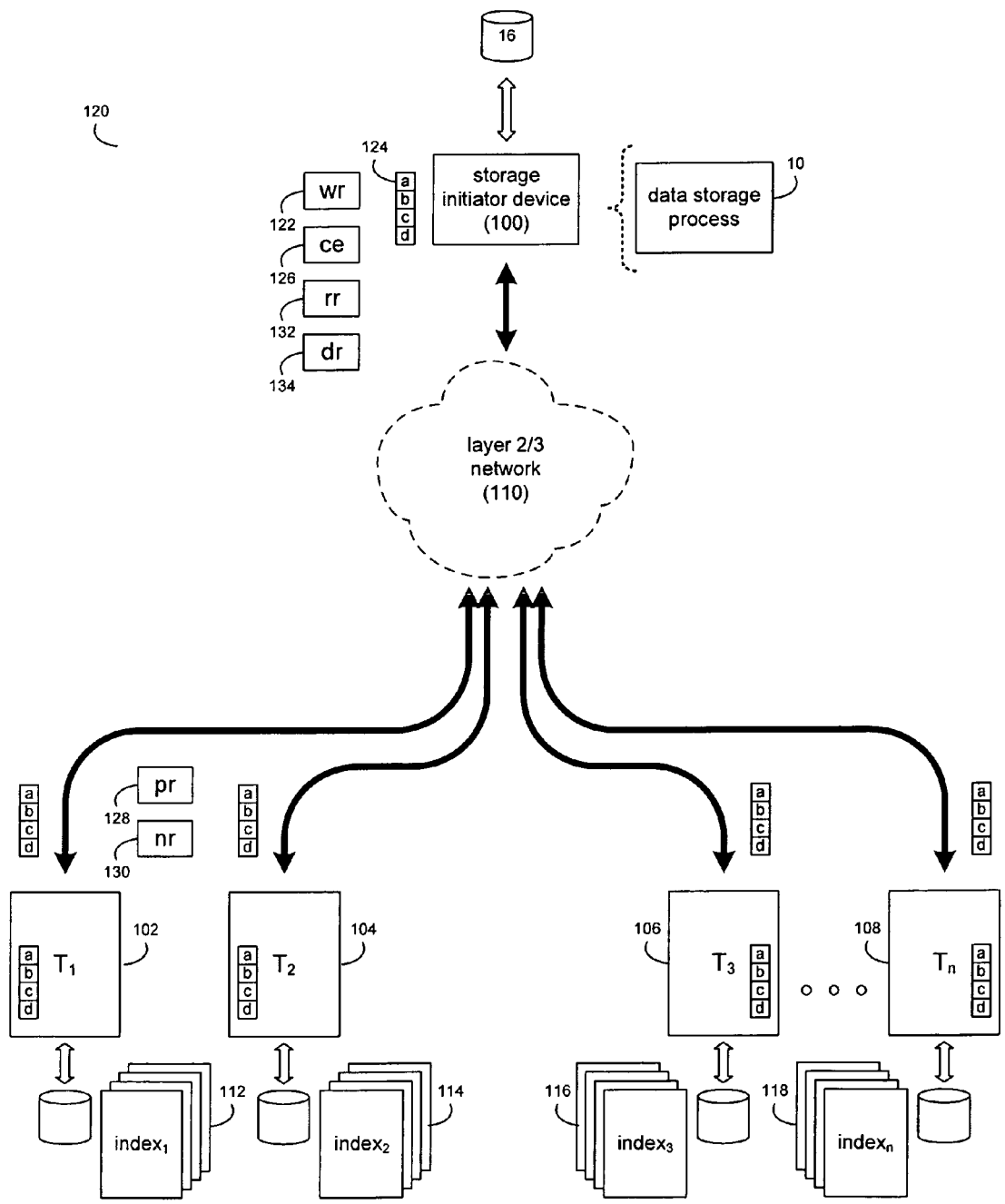
FIG. 2 is a diagrammatic view of the storage network of FIG. 1.

Referring also to FIG. 2, storage network 12 may include a storage initiator device (e.g. storage initiator device 100) and a plurality of storage targets $T_{1-n}$ (e.g. storage targets 102, 104, 106, 108). While in this particular example, storage network 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

The manner in which storage network 12 is implemented may vary depending upon e.g. the level of redundancy required. For example, storage network 12 may be configured as a SAN, in which storage initiator device 100 may be e.g., a server computer and each of storage targets 102, 104, 106, 108 may be a RAID array and/or computer-based hard disk drive. Further, one or more of storage targets 102, 104, 106, 108 may be a SAN.

In the event that storage network 12 is configured as a SAN, the various components of storage network 12 (e.g. storage initiator device 100 and storage targets 102, 104, 106, 108) may be coupled using network infrastructure 110, examples of which may include but are not limited to a Layer 2 network and a Layer 3 network.

As is known in the art, the data link layer is Layer 2 of the seven-layer OSI model as well as the five-layer TCP/IP model. Layer 2 may respond to service requests from the network layer and may issue service requests to the physical layer. Within a Layer 2 network, devices (e.g. storage initiator device 100 and storage targets 102, 104, 106, 108) may be addressed using MAC (i.e., Media Access Control) addresses. When network infrastructure 110 is a Layer 2 network infrastructure, each of storage initiator device 100 and storage targets 102, 104, 106, 108 may have a unique MAC address.

Further and as is known in the art, the network layer is Layer 3 of the seven-layer OSI model as well as the five-layer TCP/IP model. Layer 3 may respond to service requests from the transport layer and may issue service requests to the data link layer. In the TCP/IP model, Layer 3 may be referred to as the Internet layer. Within a Layer 3 network, devices (e.g. storage initiator device 100 and storage targets 102, 104, 106, 108) may be addressed using IP (i.e., Internet Protocol) addresses. When network infrastructure 110 is a Layer 3 network infrastructure, each of storage initiator device 100 and storage targets 102, 104, 106, 108 may have a unique IP address.

Generally, the network layer (i.e., Layer 3) may be responsible for end-to-end (e.g., source to destination) data delivery, whereas the data link layer (i.e., Layer 2) may be responsible for node-to-node (e.g., hop to hop) data delivery.

Storage initiator device 100 may execute all or a portion of data storage process 10. Additionally, one or more of storage targets 102, 104, 106, 108 may execute all or a portion of data storage process 10. For example, data storage process 10 may be a multi-component process that includes e.g., an initiator-based component (not shown) and a target-based component (not shown). For example and for illustrative purposes, the initiator-based component of data storage process 10 may be executed on storage initiator device 100. Further and for illustrative purposes, the target-based component of data storage process 10 may be executed on each of storage targets 102, 104, 106, 108. Accordingly, the initiator-based component of data storage process 10 and the target-based component(s) of data storage process 10 may cooperatively operate to effectuate all of the functionality of data storage process 10.

The instruction sets and subroutines of the initiator-based component of data storage process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID array; a random access memory (RAM); and a read-only memory (ROM).

The instruction sets and subroutines of the target-based component of data storage process 10, which may be stored on a storage device (not shown) coupled to e.g., each of storage targets 102, 104, 106, 108, may be executed by one or more processors (not shown) and one or more memory architectures (not shown) included within each of storage targets 102, 104, 106, 108. The storage device (not shown) may include but is not limited to: a hard disk drive; a tape drive; an optical drive; a RAID array; a random access memory (RAM); and a read-only memory (ROM).

Each of storage targets 102, 104, 106, 108 may include a storage index (e.g. storage indices 112, 114, 116, 118). Each of storage indices 112, 114, 116, 118 may define the data segments currently stored on each of storage targets 102, 104, 106, 108. Accordingly, storage index 112 may define the data segments currently stored on storage target 102; storage index 114 may define the data segments currently stored on storage target 104; storage index 116 may define the data segments currently stored on storage target 106; and storage index 118 may define the data segments currently stored on storage target 108.

Figures 3, 4:
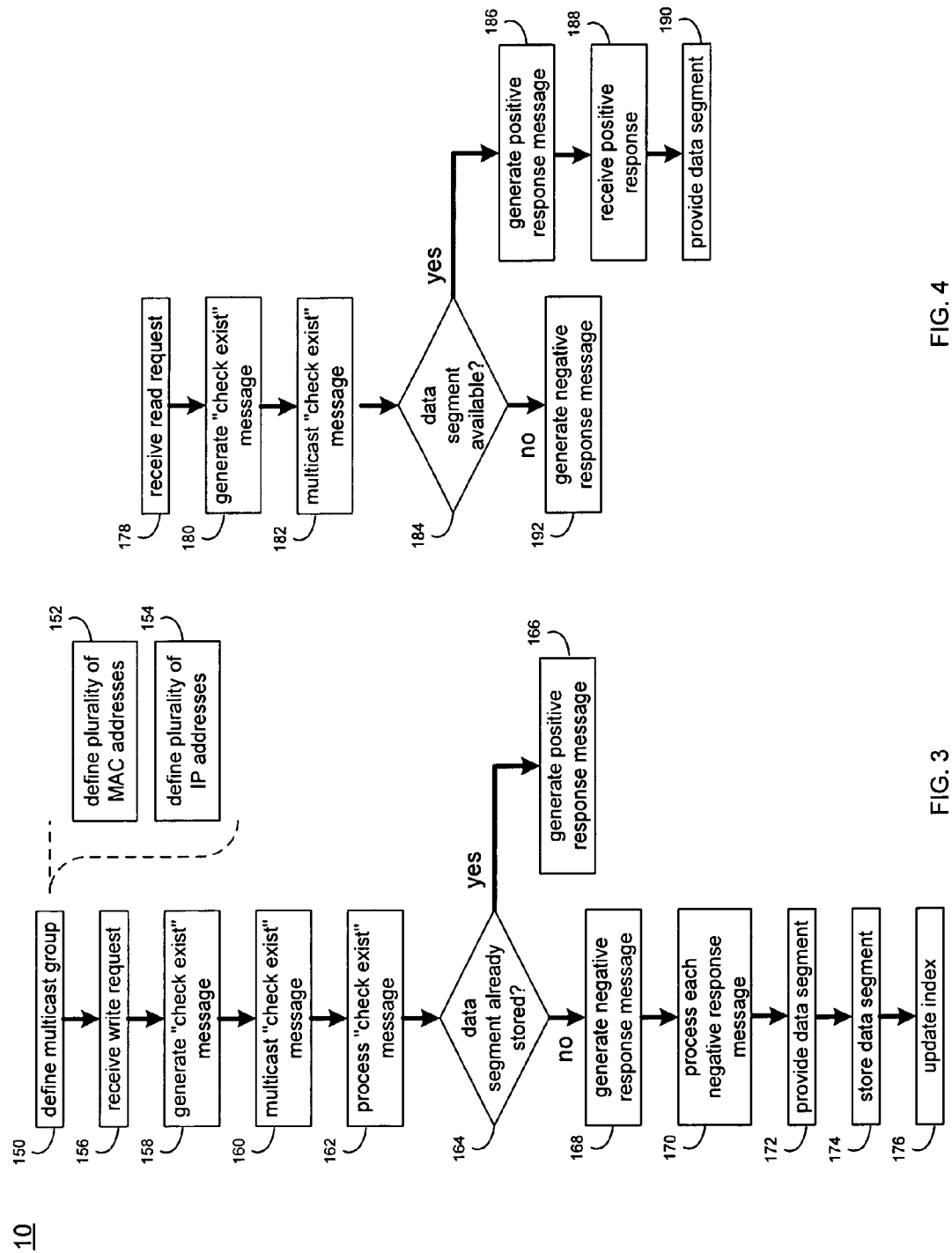
FIG. 3 is a flowchart of a data write process executed by the data storage process of FIG. 1.
FIG. 4 is a flowchart of a data read process executed by the data storage process of FIG. 1.

Referring also to FIG. 3, data storage process 10 may utilize multicasting to distribute "check exist" messages and data requests between various devices (e.g. storage initiator device 100 and storage targets 102, 104, 106, 108) included within storage network 12. Accordingly, data storage process 10 may define 150 a multicast group (e.g. multicast group 120) within network infrastructure 110, such that a message multicast by any device within storage network 12 may be received by any other device within storage network 12. When defining 150 multicast group 120, the manner in which the multicast group is defined 150 may vary depending on the type of network infrastructure (e.g. Layer 2 or Layer 3). For example, when data storage process 10 is defining 150 a multicast group within a Layer 2 network infrastructure, data storage process 10 may define 152 multicast group 120 as a plurality of MAC addresses to be addressable as a whole by a single multicast IP address. Alternatively, when data storage process 10 is defining 150 a multicast group within a Layer 3 infrastructure, data storage process 10 may define 154 multicast group 120 as a plurality of IP addresses to be addressable as a whole by a single multicast IP address.

As discussed above, various data requests (e.g. data request 20) may be sent from client applications 22, 24, 26, 28 to storage network 12, and examples of data request 20 may include but are not limited to data write requests (i.e. a request that a data segment be written to storage network 12) and data read requests (i.e. a request that a data segment be read from storage network 12).

Storage network 12 may be configured as a single instance storage system. As is known in the art, a single instance storage system is a data storage system that is configured to eliminate the storage of redundant copies of data. For example, e-mail servers may utilize a single instance storage system to prevent the redundant storage of identical attachments that are received from a plurality of senders. In order to prevent the redundant storage of such an attachment, a single instance storage system may analyze a newly-received attachment and compare characteristics of the newly-received attachment to characteristics of attachments that were previously-stored on the single instance storage system. In the event that an identical copy of the newly-received attachment was previously stored within the single instance storage system, the newly-received attachment will not be stored on the single instance storage system, thus increasing storage efficiency. Another example is when an existing file is copied (e.g., by a user) and a few bytes of new information are inserted into the file. A single instance storage system may only save the newly-added data and would not store a redundant copy of the identical portions of the copied file.

Upon storage initiator device 100 receiving 156 a write request (e.g. write request 122) for storing a data segment (e.g. data segment 124) within multicast group 120, data storage process 10 may generate 158 "check exist" message 126 that defines the data segment (e.g. data segment 124) to be stored within multicast group 120. When generating 158 "check exist" message 126, data storage process 10 may be configured to identify data segment 124 to the level of specificity necessary to ensure that an accurate determination is made concerning whether data segment 124 had been previously-stored within storage network 12. For example, while data storage process 10 may be configured to generate 158 "check exist" message 126 that identifies data segment 124 by a file name and an extension, this may not provide the appropriate level of specificity. For example, it is possible for two unique data segments to have the same file name and extension. Further, data segment 124 may not be a complete file and, therefore, may only represent a portion of a file. Therefore, in that particular situation it would not be possible to identify data segment 124 by a filename and an extension.

Accordingly, data storage process 10 may use alternate means to provide the appropriate level of specificity required to determine whether or not a data segment had been previously-stored on storage network 12. For example and for illustrative purposes, data storage process 10 may determine a mathematical hash of e.g. data segment 124. As is known in the art, when a data segment is processed using a mathematical hash function, the output of the mathematical hash function is essentially a digital "fingerprint" of the data segment that may serve to definitively identify the data segment processed using the mathematical hash function. For example, data storage process 10 may be configured to determine the mathematical hash (using a mathematical hash function) of data segment 124. Since only an identical data segment would have an identical mathematical hash, the mathematical hash of the newly-received data segment (e.g., data segment 124) that is to be stored on storage network 12 may be compared to the mathematical hash of each data segment previously-stored on storage network 12. In the event that matching hashes are found, a copy of the data segment to be stored (e.g., data segment 124) has been previously stored on storage network 12. Accordingly, the newly-received data segment (e.g. data segment 124) will not be stored again on storage network 12. Conversely, in the event that matching hashes are not found, the data segment to be stored (e.g., data segment 124) is not already present on storage network 12. Accordingly, the newly-received data segment (e.g. data segment 124) will be stored on storage network 12.

While data storage process 10 is described above as utilizing a mathematical hash function to generate a mathematical hash of data segments previously/already stored on storage network 12, this is for illustrative purposes only and is not intended to be a limitation of this disclosure, as other configurations are possible. For example, various other mathematical functions may be used to process data segments and definitively determine whether or not the processed data segment was previously stored within storage network 12.

Once generated 158 by data storage process 10, "check exist" message 126 may be multicast 160 to the plurality of storage targets (e.g. storage targets 102, 104, 106, 108) included within multicast group 120.

Once received, "check exist" message 126 may be processed 162 on each of the plurality of storage targets (e.g. storage targets 102, 104, 106, 108) to compare the data segment (e.g. data segment 124) defined within "check exist" message 126 to the data segments identified within the appropriate storage index (e.g. storage indices 112, 114, 116, 118)

to determine if the newly-received data segment (e.g. data segment 124) that is to be stored within multicast group 120 is already stored on the storage target that is processing "check exist" message 126. For example, each of storage targets 102, 104, 106, 108 may receive "check exist" message 126 that was multicast 160 by storage initiator device 100. Accordingly, storage target 102 may process 162 "check exist" message 126 to compare data segment 124 with the data segments identified within storage index 112; storage target 104 may process 162 "check exist" message 126 to compare data segment 124 with the data segments identified within storage index 114; storage target 106 may process 162 "check exist" message 126 to compare data segment 124 with the data segments identified within storage index 116; and storage target 108 may process 162 "check exist" message 126 to compare data segment 124 with the data segments identified within storage index 118.

The configuration of the various storage indices (e.g. storage indices 112, 114, 116, 118) may vary depending on the manner in which e.g. data segment 124 is defined within "check exist" message 126. For example, if data segment 124 is defined within "check exist" message 126 using a mathematical hash of data segment 124, storage indices 112, 114, 116, 118 may be configured to identify a plurality of mathematical hashes (i.e. each of which corresponds to a data segment previously stored on the appropriate storage target) and e.g. a unique disk address (associated with each mathematical hash) that defines the location of the corresponding data segment within the associated storage target.

If the storage target processing "check exist" message 126 determines 164 that the data segment (e.g. data segment 124) defined within "check exist" message 126 has already been stored on the storage target processing "check exist" message 126, positive response message 128 may be generated 166 on the storage target processing "check exist" message 126.

For example, upon receiving "check exist" message 126, storage target 102 may process 162 "check exist" message 126 to determine 164 if a copy of newly-received data segment 124 had been previously-stored on storage target 102. In the event that data segment 124 is identified within "check exist" message 126 using the above-described mathematical hash, the mathematical hash of data segment 124 (that is identified within "check exist" message 126) may be compared with a plurality of mathematical hashes identified within storage index 112 (as discussed above). If, for illustrative purposes, it is determined 164 that a copy of newly-received data segment 124 had been previously-stored on storage target 102, storage target 102 may generate 166 the above-described positive response message 128, which may be multicast to multicast group 120.

If the storage target processing the "check exist" message determines 164 that the data segment (e.g. data segment 124) defined within "check exist" message 126 has not already been stored on the storage target processing "check exist" message 126, negative response message 130 may be generated 168 on the storage target processing "check exist" message 126.

For example, upon receiving "check exist" message 126, storage target 102 may process 162 "check exist" message 126 to determine 164 if a copy of newly-received data segment 124 had been previously-stored on storage target 102. In the event that data segment 124 is identified within "check exist" message 126 using the above-described mathematical hash, the mathematical hash of data segment 124 (that is identified within "check exist" message 126) may be compared with a plurality of mathematical hashes identified within storage index 112 (as discussed above). If, for illustrative purposes, it is determined 164 that a copy of newly-received data segment 124 had not been previously-stored on storage target 102, storage target 102 may generate 168 the above-described negative response message 130, which may be multicast to multicast group 120. Negative response message 130 may include information concerning the storage target processing the "check exist" message (e.g., storage target 102) chosen from the group consisting of: identification of the available storage capacity; identification of the current load; identification of the current health; and identification of the proximity.

Continuing with the above stated example, assume that data segment 124 has never been stored on storage network 12. Accordingly, each of storage targets 102, 104, 106, 108 may generate 168 the above-described negative response message 130. If each storage target (e.g. storage targets 102, 104, 106, 108) multicasts a negative response message (e.g. negative response message 130) to multicast group 120, the negative response messages may be received and processed 170 by storage initiator device 100 to identify one or more selected storage targets, chosen from the plurality of storage targets, for storing the data segment.

As discussed above, negative response message 130 may include information concerning the storage target processing the "check exist" message (e.g., storage target 102) chosen from the group consisting of: identification of the available storage capacity; identification of the current load; identification of the current health; and identification of the proximity. Accordingly, when processing 170 the received negative response messages, data storage process 10 may consider the available storage capacity of each storage target. For example, if each of storage targets 102, 104, 106 is at least 90% utilized and storage target 108 is only 30% utilized, data storage process 10 may select storage target 108 as the storage target on which data segment 124 will be stored, thus allowing data storage process 10 to balance the utilization of the various storage targets. Alternatively, a more-utilized storage target may be chosen by data storage process 10 if the more-utilized storage target is less busy that a less-utilized storage target.

In the event that, upon processing 170 the various negative response messages received from the various storage targets, data storage process 10 selects storage target 108, data storage process 10 may provide 172 (e.g., via a unicast) data segment 124 to selected storage target 108. Upon selected storage target 108 receiving data segment 124, data storage process 10 may store 174 data segment 124 on storage target 108. Additionally, data storage process 10 may update 176 a storage index 118 (i.e. the storage index of storage target 108) to identify data segment 124 as being stored within storage target 108. In the event that data segment 124 is identified within "check exist" message 126 using the above-described mathematical hash, data storage process 10 may update 176 the storage index 118 to include the mathematical hash of data segment 124 and the unique disk address that defines the location of data segment 124 within storage target 108.

While the system is described above as only saving a single copy of data segment 124 within storage network 12, this is for illustrative purposes only and is not intended to be a limitation of this disclosure. For example, data storage process 10 may be configured to save multiple copies of e.g. data segment 124 within storage network 12, thus providing a level of high availability with respect to data segment 124.

Referring also to FIG. 4, upon storage initiator device 100 receiving 178 read request 132 for reading a data segment (e.g. data segment 124) from multicast group 120, data storage process 10 may generate 180 "check exist" message 126 that defines the data segment (e.g. data segment 124) to be read from multicast group 120. As discussed above, when generating 180 "check exist" message 126, data storage process 10 may be configured to identify data segment 124 to the level of specificity necessary (including via a mathematical hash function) to ensure that an accurate determination is made concerning whether data segment 124 is available within storage network 12. Once generated 180 by data storage process 10, "check exist" message 126 may be multicast 182 to the plurality of storage targets (e.g. storage targets 102, 104, 106, 108) included within multicast group 120.

Once received, "check exist" message 126 may be processed on each of the plurality of storage targets (e.g. storage targets 102, 104, 106, 108) to compare the data segment (e.g. data segment 124) defined within "check exist" message 126 to the data segments identified within the appropriate storage index (e.g. storage indices 112, 114, 116, 118) to determine 184 if the newly-received data segment (e.g. data segment 124) is available on the storage target that is processing "check exist" message 126. For example, each of storage targets 102, 104, 106, 108 may receive "check exist" message 126 that was multicast 182 by storage initiator device 100. Accordingly, storage target 102 may process "check exist" message 126 to compare data segment 124 with the data segments identified within storage index 112; storage target 104 may process "check exist" message 126 to compare data segment 124 with the data segments identified within storage index 114; storage target 106 may process "check exist" message 126 to compare data segment 124 with the data segments identified within storage index 116; and storage target 108 may process "check exist" message 126 to compare data segment 124 with the data segments identified within storage index 118.

If the storage target processing "check exist" message 126 determines 184 that the data segment (e.g. data segment 124) defined within "check exist" message 126 is available on the storage target processing "check exist" message 126, positive response message 128 may be generated 186 on the storage target processing "check exist" message 126.

For example, upon receiving "check exist" message 126, storage target 102 may process "check exist" message 126 to determine 184 if data segment 124 is available on storage target 102. In the event that data segment 124 is identified within "check exist" message 126 using the above-described mathematical hash, the mathematical hash of data segment 124 (that is identified within "check exist" message 126) may be compared with a plurality of mathematical hashes identified within storage index 112 (as discussed above). If, for illustrative purposes, it is determined 184 that data segment 124 is available on storage target 102, storage target 102 may generate 186 the above-described positive response message 128, which may be multicast to multicast group 120. Additionally, data segment 124 may be attached to positive response message 128 prior to multicasting positive response message 128 to multicast group 120.

Upon receiving 188 positive response message 128 on storage initiator device 100, data storage process 10 may generate data request 134 which may be provided (e.g. via multicast or unicast) to the storage target that multicast positive response message 128 (e.g. storage target 102).

Upon receiving data request 134 from storage initiator device 100, storage target 102 may provide 190 data segment 124 to storage initiator device 100. Once data segment 124 is received on storage initiator device 100, data storage process 10 may transmit data segment 124 to the client electronic device (e.g., personal computer 38, laptop computer 40, personal digital assistant 42, and notebook computer 44) that requested data segment 124.

If the storage target processing "check exist" message 126 determines 184 that the data segment (e.g. data segment 124) defined within "check exist" message 126 is not available on the storage target processing "check exist" message 126, negative response message 130 may be generated 192 on the storage target processing "check exist" message 126, which may be multicast to multicast group 120.

While data storage process 10 is described above as being utilized within a single instance storage system, this is for illustrative purposes only and is not intended to be a limitation of this disclosure, as other configurations are possible. For example, data storage process 10 may be utilized in a distributed file system, distributed database, distributed block storage, distributed local area web cache, distributed compute cluster, distributed object storage, and distributed name service.

A number of implementations have been described. Nevertheless, it will be understood that various modifications may be made. Accordingly, other implementations are within the scope of the following claims.

What is claimed is:

1. A data storage method comprising:
defining a multicast group within a local area network, wherein the multicast group includes a storage initiator device and a plurality of storage targets, wherein each of the plurality of storage targets includes:
a storage index that identifies one or more data segments stored on the storage target;
receiving, on the storage initiator device, a write request for storing a data segment within the multicast group;
generating a "check exist" message that defines the data segment to be stored within the multicast group;
multicasting the "check exist" message to the plurality of storage targets included within the multicast group;
processing the "check exist" message on each of the plurality of storage targets to compare the data segment defined within the "check exist" message to the one or more data segments identified within the storage index to determine if the data segment to be stored within the multicast group is already stored on the storage target processing the "check exist" message; and
generating, on the storage target processing the "check exist" message, a negative response message that is multicast to the multicast group, wherein the negative response message includes information concerning the storage target processing the "check exist" message chosen from the group consisting of: identification of the available storage capacity; identification of the current load; identification of the current health; and identification of the proximity.

2. The data storage method of claim 1, wherein if it is determined by the storage target processing the "check exist" message that the data segment defined within the "check exist" message is already stored on the storage target processing the "check exist" message, the data storage method further comprising:
generating, on the storage target processing the "check exist" message, a positive response message that is multicast to the multicast group.

3. The data storage method of claim 1 wherein each storage target multicasts a negative response message to the multicast group, the data storage method further comprising:
processing, on the storage initiator device, each of the negative response messages to identify one or more selected storage targets, chosen from the plurality of storage targets, for storing the data segment; and providing the data segment to the one or more selected storage targets.

4. The data storage method of claim 3 further comprising:

storing the data segment on each of the one or more selected storage targets; and updating the storage index on each of the one or more selected storage targets to identify the data segment.

5. A computer program product residing on a computer readable medium having a plurality of instructions stored thereon which, when executed by a processor, cause the processor to perform operations comprising:

defining a multicast group within a local area network, wherein the multicast group includes a storage initiator device and a plurality of storage targets, wherein each of the plurality of storage targets includes:

a storage index that identifies one or more data segments stored on the storage target;

receiving, on the storage initiator device, a write request for storing a data segment within the multicast group;

generating a "check exist" message that defines the data segment to be stored within the multicast group;

multicasting the "check exist" message to the plurality of storage targets included within the multicast group;

processing the "check exist" message on each of the plurality of storage targets to compare the data segment defined within the "check exist" message to the one or more data segments identified within the storage index to determine if the data segment to be stored within the multicast group is already stored on the storage target processing the "check exist" message; and generating, on the storage target processing the "check exist" message, a negative response message that is multicast to the multicast group, wherein the negative response message may include information concerning the storage target processing the "check exist" message chosen from the group consisting of: identification of the available storage capacity; identification of the current load; identification of the current health; and identification of the proximity.

6. The computer program product of claim 5, wherein if it is determined by the storage target processing the "check exist" message that the data segment defined within the "check exist" message is already stored on the storage target processing the "check exist" message, the computer program product further comprising instructions for:

generating, on the storage target processing the "check exist" message, a positive response message that is multicast to the multicast group.

7. The computer program product of claim 5 wherein each storage target multicasts a negative response message to the multicast group, the computer program product further comprising instructions for:

processing, on the storage initiator device, each of the negative response messages to identify one or more selected storage targets, chosen from the plurality of storage targets, for storing the data segment; and providing the data segment to the one or more selected storage targets.

8. The computer program product of claim 7 further comprising instructions for:

storing the data segment on each of the one or more selected storage targets; and updating the storage index on each of the one or more selected storage targets to identify the data segment.

* * * * *